United States Patent [19]
Wynblatt et al.

[11] Patent Number: 6,018,710
[45] Date of Patent: *Jan. 25, 2000

[54] WEB-BASED INTERACTIVE RADIO ENVIRONMENT: WIRE

[75] Inventors: Michael J. Wynblatt, Plainsboro; Arding Hsu, Kendall Park, both of N.J.; Daniel C. Benson, Seattle, Wash.

[73] Assignee: Siemens Corporate Research, Inc., Princeton, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/768,046

[22] Filed: Dec. 13, 1996

[51] Int. Cl.[7] .................... G10L 5/02; G10L 5/06

[52] U.S. Cl. .................... 704/260; 704/243; 704/275; 707/3; 707/10

[58] Field of Search .................... 704/260, 275, 704/243; 395/793, 785; 707/3, 10

[56] References Cited

U.S. PATENT DOCUMENTS

| | | | |
|---|---|---|---|
| 5,305,244 | 4/1994 | Newman et al. | 364/708.1 |
| 5,479,411 | 12/1995 | Klein | 370/110.1 |
| 5,528,739 | 6/1996 | Lucas et al. | 395/145 |
| 5,572,643 | 11/1996 | Judson | 395/793 |
| 5,659,692 | 8/1997 | Poggio et al. | 395/330 |
| 5,708,828 | 1/1998 | Coleman | 395/785 |
| 5,715,370 | 2/1998 | Luther et al. | 704/275 |
| 5,819,220 | 10/1998 | Sarukkai et al. | 704/243 |

OTHER PUBLICATIONS

Article by T. Kahlisch, entitled "Improving Access to Hypertext Based Study Material for the Blind", ICCHP Conference 1996, Linz, Austria, May 2, 1996, pp. 1–6.

Article by T.V. Raman et al., entitled "Aster—Towards Modality–Independent Electronic Documents", DAGS 1995 Conference on Electronic Publishing and the Information Superhighway, May 30–Jun. 2, 1995, pp. 1–3.

Article by T.V. Raman et al., entitled "Interactive Audio Documents", Assets 1994. The First Annual ACM Conference on Assistive Technologies, Los Angeles, CA, Oct. 31–Nov. 1, 1994, abstract page only.

Article by T.V. Raman et al., entitled "Emacspeak—A Speech Interface", CHI 1996 Conference Proceedings, Apr. 13–18, 1996, pp. 66–71.

Article by M. Krell et al., entitled "V–Lynx: Bringing the World Wide Web to Sight Impaired Users", Assets 1996. Second Annual ACM Conference on Assistive Tech., Vancouver, Canada, Apr. 11–12, 1996, pp. 23–26.

*Primary Examiner*—David R. Hudspeth
*Assistant Examiner*—Vijay B Chawan
*Attorney, Agent, or Firm*—Donald B. Paschburg

[57] ABSTRACT

A system for providing a primarily audio environment for world wide web access includes a system for rendering structured documents using audio, an interface for information exchange to users, a non-keyword based WWW search system and a few miscellaneous features. The system for rendering structured documents using audio includes a pre-rendering system which converts a HTML document into an intermediate document and a rendering system which actually generates an audio output. The interface includes a non-visual browsing system and an interface to users for visual browsing environments.

22 Claims, 4 Drawing Sheets

WEB-BASED INTERACTIVE RADIO ENVIRONMENT: WIRE

BACKGROUND OF THE INVENTION

1. Field of the Invention

The present invention relates to accessing the world wide web and more particularly to a primarily audio environment for world wide web access.

2. Description of the Prior Art

The World Wide Web (WWW) is rapidly becoming the single most important source of information for businesses and consumers. With any source of information, a trade-off is involved between the value of information discovered and the opportunity cost of the time spent discovering it. Recent advances in technology, like the cellular phone, have helped people to improve the result of this trade-off, allowing them to better utilize time which would otherwise be unproductive, such as the time spent commuting to work, or exercising. The WWW, however, is difficult to use in such situations, because existing WWW browsers require significant visual attention and a high degree of interactivity.

It is an object of the present invention to provide a system which can access the World Wide Web in a situation where a computer monitor and/or keyboard are not readily available. The idea is to substitute audio playback for text and visual feedback, and to substitute physical manipulation of buttons and dials for virtual manipulation of GUI elements. Other systems, like Web-On-Call by Netphonic, allow similar functionality, but require extensive preparation at the server side. This means that users can only access the small number of servers which are customers of this service. It is an object of the present invention that the system is capable of doing all of its work at the client side, so users can access any web server.

Recently, a company known as The Productivity Works released a WWW browser called WebSpeak. This browser is intended for the visually impaired. Although this system includes large type and other visual features, it also uses text-to-speech synthesis to present HTML documents. The internal workings of this system are not known and no further information is available to the applicants at this time.

SUMMARY OF THE INVENTION

The WIRE system of the present invention offers a solution to the above problems by providing a non-visual browsing environment for the WWW. Such a system is also extremely useful for visually-impaired web surfers. The key components of the WIRE system are; a system for rendering structured documents using audio, an interface for information exchange to users, a non-keyword based WWW search system and a few miscellaneous features. The system for rendering structured documents using audio includes a pre-rendering system which converts a HTML document into an intermediate document and an audio rendering system which actually generates an audio output. The interface includes a non-visual browsing system and an interface to users for visual browsing environments.

DETAILED DESCRIPTION OF THE INVENTION

The WIRE system of the present invention is a set of software technologies and a user interface paradigm which can be used to access the World Wide Web in a situation where a computer monitor and/or keyboard are not readily available. As stated above, the idea is to substitute audio playback for text and visual feedback, and to substitute physical manipulation of buttons and dials for virtual manipulation of GUI elements. The WIRE system of the present invention does all of its work at the client side, so users can use it to access any web server. In order to achieve this object, several new technologies and methodologies were developed which are described below.

Throughout this specification, the term "render" is used in the sense of "to reproduce or represent by verbal or artistic means", as it is often used in the computer graphics and computer audio communities, i.e. "to render a data set". Specifically, the phrase "to render a structured document" means to take the document, including its data, its structural elements, and its formatting and convert it to an audio representation.

Figure 1:
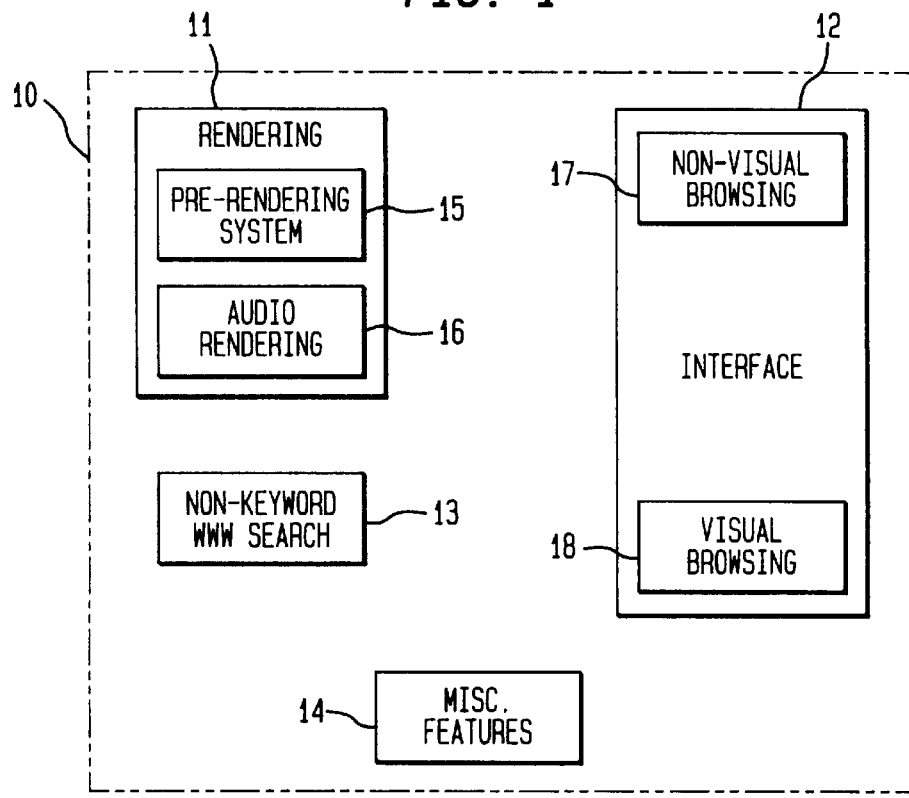
FIG. 1 illustrates a block diagram of one embodiment of the present invention.

FIG. 1 illustrates one embodiment of the WIRE system 10 of the present invention. The key components of the WIRE system 10 are: a system for rendering structured documents using audio 11, an interface 12 for information exchange to users, a non-keyword based WWW search system 13 and a few miscellaneous features 14. The system for rendering structured documents using audio 11 includes a pre-rendering system 15 which converts a HTML document into an intermediate document and an audio rendering system 16 which actually generates an audio output. Interface 12 includes a non-visual browsing system 17 and an interface to users for visual browsing environments 18.

The first component is the rendering structured documents using audio feature 11. Existing WWW browsers render HTML documents visually on a computer monitor. As an alternative, the WIRE system of the present invention provides an audio rendering of HTML documents, which is a way of presenting WWW content, including text, structure, and representation, using only audio playback. The architecture of the WIRE document rendering module is applicable to any kind of structured document but for explanation purposes, the implementation described below is for HTML documents since they are the most prevalent type of structured document on the WWW. As is well-understood by those skilled in the art, structured documents (such as HTML documents) are computer-readable files in which the display formatting and/or abstract structure are defined by instructions which are co-mingled with the text. In addition to HTML documents, common examples of structured document formats include XML, Microsoft Word, PDF, Tex, and WML.

The process used in WIRE for rendering an HTML document consists of two parts: the pre-rendering system 15 which converts the HTML document into an intermediate document, and the audio rendering system 16, which actually generates the audio output. Some parts of the two processes may occur concurrently, but they are logically separate.

Figure 2:
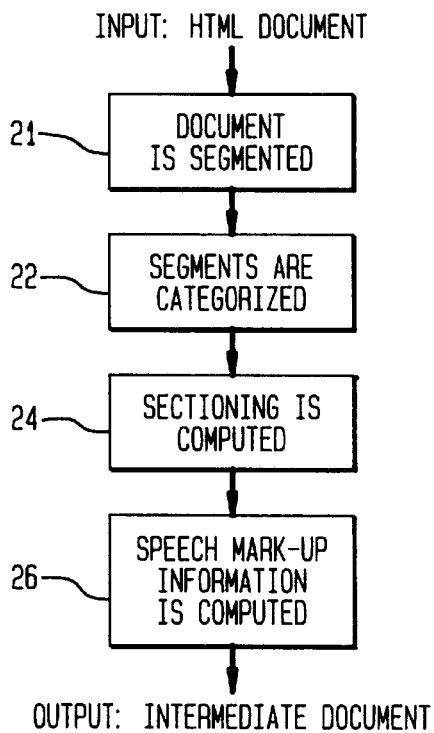
FIG. 2 illustrates the pre-rendering analysis of an HTML document which takes place in the rendering structured documents feature.

The pre-rendering analysis is shown in FIG. 2. The first stage of analysis is to divide the HTML document into logical segments as shown by Document is Segmented 21. This is accomplished by looking for syntactic elements in the HTML document which generally indicate the boundaries between areas of different content. The syntactic elements which are used are horizontal rules, and tags marking the beginning of tables, rows and columns. These elements are then considered segment boundaries.

The output of Document is Segmented 21 is sent to Segments are Categorized 22. This second stage of analysis categorizes the segments of the HTML document as either navigation segments or content segments. The categorization is accomplished by calculating the link density of each segment. Link density is a measure of the amount of content within a given segment contained within anchors for hyperlinks. In the WIRE system of the present invention, an empirical formula to calculate the link density, D, is used.

$$D = \frac{C_{HREF} + (K * L_I)}{C}$$

Where $C_{HREF}$ is the number of non-tag characters in the segment which appear inside of HREF tags, C is the total number of non-tag characters in the segment, and $L_I$ is the number of hyperlinks within image maps in the segment. C is always assigned a value of at least 1, even if there are no non-tag characters in the segment. The value K represents the weight given to image map links and empirically is determined to have a value of 5. If a segment has a link density D>0.7, it is categorized as a navigation segment, otherwise it is categorized as a content segment. The value 0.7 was empirically determined to be appropriate.

The output of Segments are Categorized 22 flows to Document Sectioning 24. This third stage of analysis is to determine the section structure of the HTML document. The section structure differs from the segmentation, and the eventual use of each will be discussed shortly.

Only content segments are analyzed for section information. Each content segment is considered a top-level section. Within content sections any occurrence of a header tag or a fontsize tag is noted. In HTML, header tags are valued from 1 to 6 in decreasing order of prominence, while fontsize can range from 1 to 7 in increasing order of size. In the sectioning process, fontsize tags larger than the default text size are treated as header tags with prominence equal to 8 minus their size value. Relative fontsize tags, such as <fontsize+2>, are first converted to absolute sizes by applying them to the default text size value. Fontsize tags defining sizes smaller than the default size are ignored.

The result is a hierarchy of header tags of varying prominence. Sections are then defined hierarchically, using the header tags as boundaries, with the top-level sections forming the top of the hierarchy, and the header tags denoting the subsections, sub-subsections, and as many further gradations as are necessary to account for the number of prominence values present in the document.

The output of Document Sectioning 24 flows to Computation of Speech Mark-up Information 26. This final step of the analysis is to create an intermediate document which can be interpreted by a text-to-speech engine. Fundamentally, this step produces the meta-information, in the form of commands, which will cause the text-to-speech engines to vary its voice, tone, rate and other parameters to adequately convey the information within the HTML document. In this example, commands are given for a Microsoft SAPI compliant text-to-speech engine. Computation of Speech Mark-up Information 26 also determines which text will be presented to the user. Computation of Speech Mark-up Information 26 is fully described in FIG. 3. Finally, additional meta-information is provided to denote segment boundaries for use during playback.

One type of meta-command which the procedure of the present invention produces is a command to switch from one voice to another, depending on the type of text being spoken. In this example, four voices are used for the rendering. Voice one and two are used for normal text passages and one of them is always considered to be the active voice. The variable V stores the current active voice. Voice three is used for section headings and titles, and voice four is used for hyperlink anchor text. The exact parameters of each voice are not critical, and different users may choose different voices.

Figure 3:
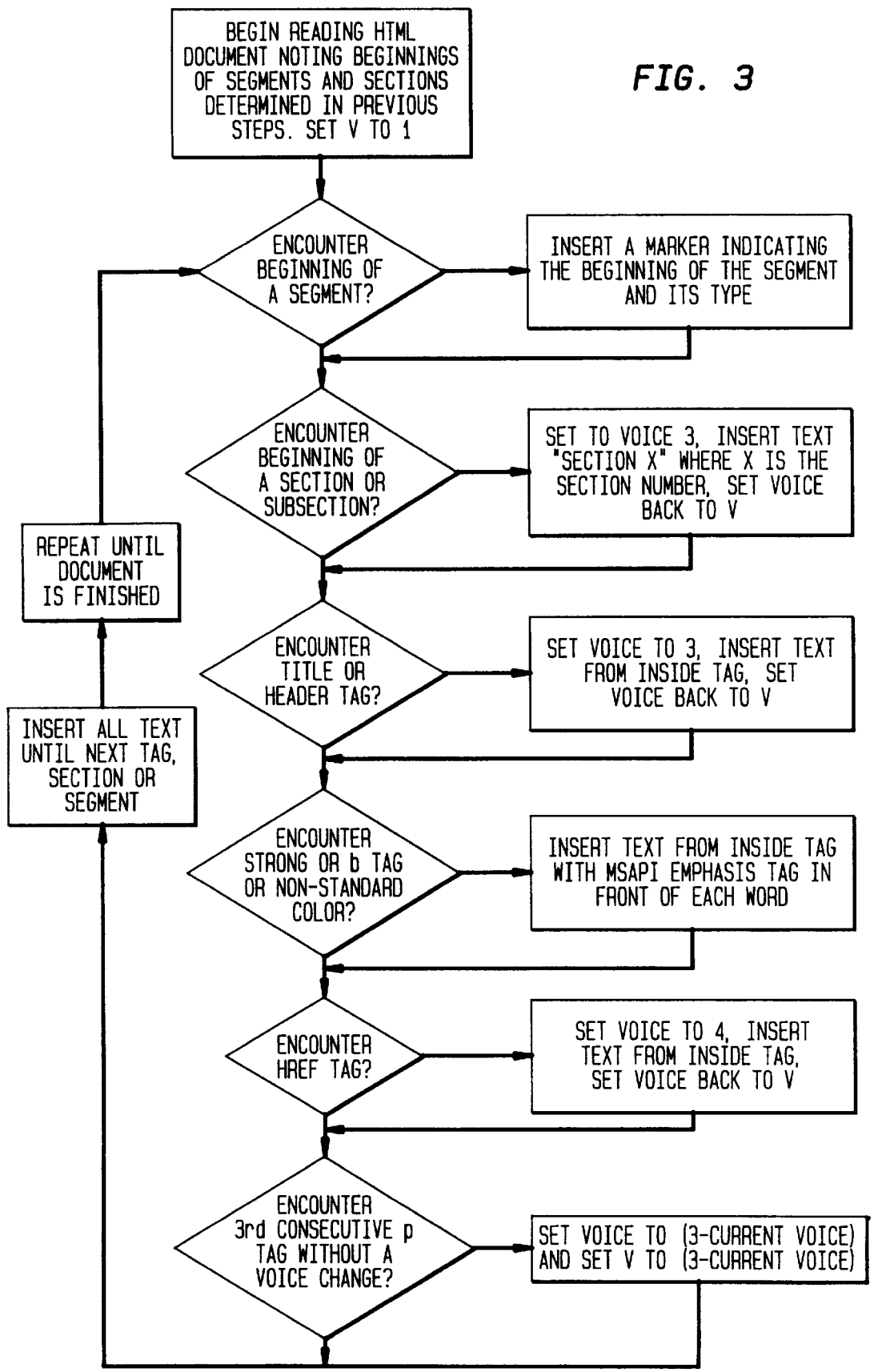
FIG. 3 illustrates the process of computing the speech markup information for the intermediate document of the pre-rendering analysis.

As described in FIG. 3, the process of generating the intermediate document consists of parsing the original structured document, along with the segmentation and sectioning information determined in the previous phases, and producing output accordingly. Normally, non-tag text is simply echoed to the intermediate document while tag information is discarded, but additional output is generated in the following cases: At the beginning of each segment, a marker is written indicating the new segment and its type. At the beginning of each section, subsection, or finer granularity section, text is written to the intermediate document stating "Section X", where X is the section number. For example, in the second subsection, of the third subsection, of the first content segment (top level section), the text "Section 1.3.2" would be written. The voice is switched to voice three to read this section header, and then switched back to the active voice, V. This is accomplished by writing voice commands into the intermediate file before and after the new text. When a title or header tag is found in the HTML, the voice is switched to voice three, the text inside the tag is written, and the voice is switched back to the active voice. When a strong or b (bold) tag is encountered in the HTML, or when the text color is changed to a non-default color inside a section primarily using the default color, an /EMP tag is written to the output document before each word of the text within that tag. If an HREF tag is encountered, a link marker is placed in the document, the voice is switched to voice four, the text inside the tag is written, and the voice is switched back to the active voice, V. If a third consecutive p (paragraph) tag is found without the voice having been varied, the voice is switched to voice number three minus the active voice number. This effectively toggles the active voice between one and two. The V flag is used to store the active voice number, and this is also updated to three minus the active voice number. The purpose of this change in the active voice is to break the monotony of having the same synthesized voice play continuously for a great length of time.

Figure 4:
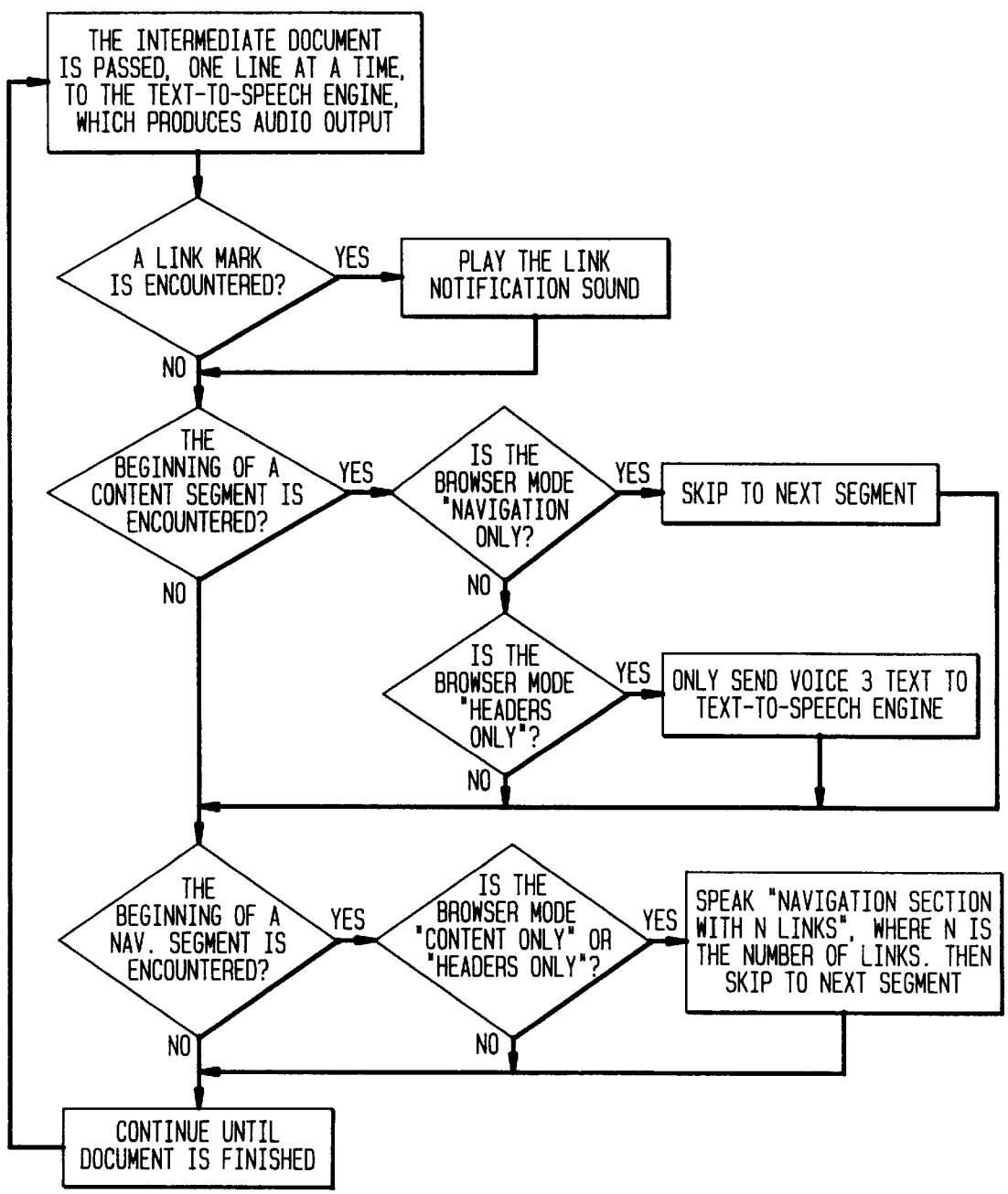
FIG. 4 illustrates the process of rendering the intermediate document and generating speech and other audio.

During the rendering process, shown in FIG. 4, the intermediate document is parsed. In general, all of the text and meta-information is passed directly to the text-to-speech engine, which then produces an audio output. The exception is that any given segment may be skipped depending on the browsing mode of the user. Browsing mode is discussed more completely below. In addition, whenever a link mark is encountered, an alert noise is played to alert the user of the presence of a hyperlink.

Figure 5:
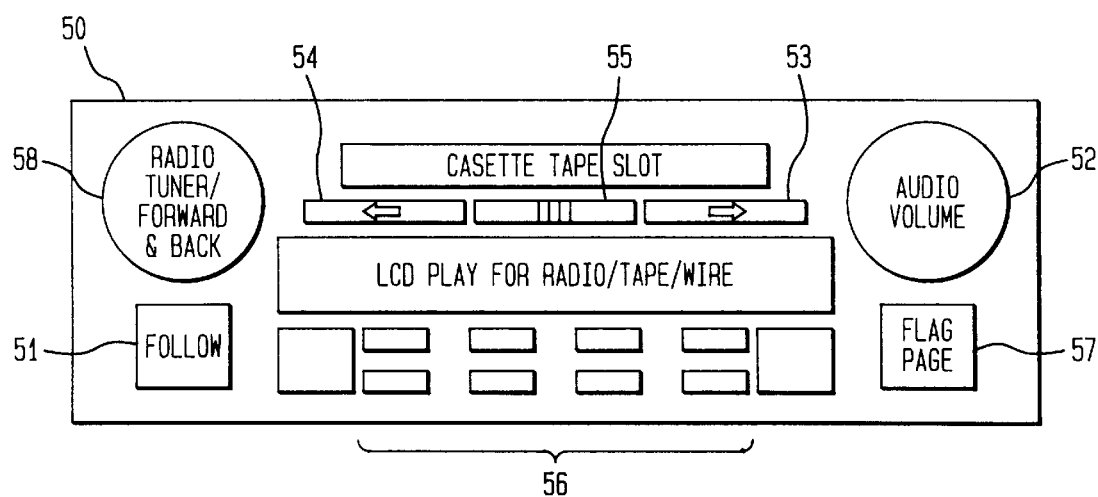
FIG. 5 illustrates a sample interface panel for the WIRE system of the present invention.

The following will describe a non-visual browsing system. Existing WWW browsers use GUI elements and visual feedback to control navigation through webspace. To replace these in a non-visual environment, the WIRE system uses the several techniques described below. FIG. 5 shows a sample interface panel 50 as a reference for the discussion. The interface panel 50 of this embodiment is styled after the controls of a car radio, to demonstrate how the WIRE system interface can be integrated into such a system.

The basic method of navigation in a WIRE environment is to listen to the audio feedback of the browser and press the follow button 51 to follow the most recently played hyperlink. Hyperlinks are identified to the user audibly in two ways. First, a notification sound effect is played just before the hyperlink anchor is played. Second, the hyperlink anchor itself is spoken using a different voice than the rest of the text. The most recently played hyperlink is called the active link. The volume of the audio signal would be controlled by an audio volume dial 52 as shown in FIG. 5.

As listening to an entire web-page is not always practical, the WIRE system of the present invention could offer four modes of browsing. Each mode allows the user a specific kind of rendering of a page based on the information in the intermediate document. In normal mode, all segments are played in entirety. In navigation mode, only navigation segments are played. In content mode, only content segments are played, but navigation segments are announced. The announcement of navigation segments is given as "Navigation section, with N links", where N is the number of hyperlinks in that segment. In header mode, only headers are played. Headers can either be from header tags, or from fontsize tags, as described above. All modes begin a document by speaking the title of the document.

Users can "scroll" through a document using the scan-forward 53, scan-reverse 54 and pause 55 controls. These controls function somewhat differently depending on the current browser mode. In normal mode and content mode, the scan-forward control causes the playback to skip to the next line in the intermediate document. The scan-reverse control causes the playback to skip to the previous line of the intermediate document. In navigation mode, scan-forward control causes the playback to skip to the next hyperlink anchor, and the scan-reverse control causes the playback to skip to the previous hyperlink anchor. In header mode the scan-forward control causes the playback to skip to the next header, and the scan-reverse control causes the playback to skip to the previous header.

The WIRE system maintains a traditional WWW browser history list. Users may move back and forth in the history list, one page at a time, using the history list control 58. The history list control can be implemented as a dial to allow quicker access, in which case an audible signal, such as a click, is used each time a page is reached. By listening to the number of clicks, the user can gauge his progress through the list.

As described above, the rendering of each document always begins with the speaking of the document's title, so the user can quickly discover his location.

The WIRE system provides for immediate access to a number of user selected WWW documents, through the use of the favorite control(s) 56. This control is analogous to the bookmarks of a traditional hypertext browser or the preset station buttons on a radio, in that it symbolizes a persistent address which the WIRE system will jump to immediately. The address in this case is a WWW URL. The favorite control also allows the active page (the one being rendered, or most recently rendered) to be marked as a favorite. A discussion of how the favorite button can be modified off-line is included below.

The following will describe an interface to visual browsers. The WIRE system is not intended as a user's primary WWW browser, but rather as a browser which he may use in environments where a visual display is not available or not practical. As a result, the user may employ a standard visually oriented browser at other times, and may wish to pass information between the WIRE compliant browser and the visually oriented browser. The WIRE system supports this kind of information of transfer in two ways.

The following will describe off-line designation of favorites. The favorites control described above may be reset off-line using a visually based browser or web-authoring tool. One implementation of this scheme is to store the favorites as a structured document, such as an HTML document, on a web-server. The WIRE device may download this document at start-up time, and make any changes by posting them to the web-server. Similarly, the user could access and modify the document using any other browsing or authoring system when not in a WIRE environment.

The following will describe document flagging. The WIRE system provides an additional flag page control 57 for flagging documents. Flagging a document denotes it as being of interest outside of the WIRE environment, and brings it to the attention of non-WIRE browsers. When using another browser, the user has quick (bookmark-like) access to any such pages. This scheme may be implemented by using a structured document to store the URLs of each of the flagged pages as a set of hyperlinks, and storing this document at a web-server. The WIRE compliant browser automatically updates the document by adding a hyperlink to the URL of any flagged page either through HTTP post or FTP. Any other WWW browser may access this page (or perhaps bookmark it), thus acquiring a set of hyperlinks to the flagged pages, and in turn gaining quick access to the flagged pages themselves.

The following will describe a non-keyboard web search technique. Typical WWW browsing involves the use of search engines to find documents on a given subject. In most traditional WWW environments, search engines are keyword driven, that is, queries are performed using keywords entered by the user with a text input device. The WIRE system offers two alternatives to such a system, which are more practical in an environment which lacks a monitor and keyboard.

WIRE allows users to search for WWW documents through a progressive refinement style search. In this system the user is prompted with a number of broad categories from which to choose, for example: Business and Commerce, Science, Literature and the Arts, etc. The user chooses one by using the follow control as described above, and may scan the list using the scan-forward and scan-reverse controls as described above. After a category is selected, the user is prompted with a list of more specific categories from which to choose, and then yet another list of still more refined categories. The process continues until eventually some (or all) of the list elements are refined enough to represent specific documents rather than categories. If the user selects one of these elements, the WIRE system loads and renders the associated document. Browsing then continues as normal.

Other features of this system include: a control to move back to the previous list, automatic looping at the end of a list, and a control that creates a category list from all of the categories from which the current category can be derived. There is also a control to move to the topmost category list.

This system is similar to the visual-based progressive refinement system used by the Yahoo! company's search engine.

The following will describe rooted DAG browsing without visual feedback. The category hierarchy in the progressive refinement technique described above can be represented as a rooted directed acyclic graph (RDAG). The browsing scheme can thus be generalized as a method for browsing RDAGs in a non-visual environment. The WIRE scheme of the present invention offers the following features for RDAG browsing:

1. Automatic, looping traversal across sibling nodes until an operation is selected.
2. An operation to move back to the parent node from which you arrived, and the list of its siblings.
3. An operation to move to the parent node from which you arrived, and the list of all other parents of the node being departed.
4. An operation to move to the child list of a node.
5. An operation to move directly to the root.

The present invention has the benefit that the user always has some context of their current position, since they can always listen to the rest of the nodes in the list being presented. It also has the advantage over purely tree based systems that it allows the same node to have several parents. This allows more sophisticated representation hierarchies than are possible in a simple tree. Operation three therefore offers a powerful browsing option not available in tree-based systems.

Note that if operation two is performed in certain combinations after operation three, the result is not defined formally above. In this case, operation two should be treated as operation three.

The following will describe speech recognition keyword entry. WIRE offers an alternative searching mechanism to the system described above. If quality speech-to-text (speech recognition) software is available, the user may employ traditional keyword searches by speaking the keyword. Whether the word can be spoken explicitly, or spelled out letter-by-letter instead, is a function of the quality of the speech-to-text mechanism.

The WIRE system of the present invention has several other miscellaneous features such as E-mail support. In addition to acting as a WWW browser, the WIRE system can also serve as an Internet mail reader. The system can read e-mail messages to the user by using text-to-speech translation. The rendering of each message begins with the From and Subject lines from the mail header using a different voice. The user may scan the message queue using the history control described above.

WWW URLs which are embedded in an e-mail message are recognized and rendered as hyperlinks. They may be followed using the follow control described above. If such an action is performed, WIRE's WWW browser functions are automatically invoked and replace the e-mail reader functions.

The following will describe support for audio files and streaming. The WIRE system is able to render digital audio data stored in the form of WWW files. If a URL represents an audio file, either structured data (such as MIDI) or unstructured data (such as WAV), the file is rendered in the customary way. During the playback, the scan-forward, scan-reverse and pause controls function in the traditional way.

The WIRE system also supports streaming of audio data using the common streaming protocols, such as RealAudio.

The following will describe radio and commercials during document download. During the time spent downloading a new WWW document, the WIRE system may automatically switch playback to a live commercial radio feed. The particular radio station featured may be chosen by the user in some cases, or may be specified by the ISP in other cases.

One way in which this feature can be used is in conjunction with an all-advertisement radio station. By gaining wide exposure to WIRE users, advertisers may be encouraged to subsidize the WIRE connection fees, allowing wider audiences to use WIRE.

Alternatively, the WIRE system could deliver prerecorded commercials during downloading periods, refreshed occasionally from the WIRE service provider. Since the WIRE service provider would have access to a profile of which web sites the user had visited, these commercials might be targeted specifically to the individual user. Users may agree to this sort of policy if the advertisements significantly reduced the cost of the WIRE service.

The WIRE system of the present invention is a collection of technologies which allow access to the WWW in the absence of a visual display. Although WIRE is not intended as a user's primary WWW browser, WIRE technology may be useful to those whose time is precious and who will benefit from WWW access from an automobile or a hand-held device, or any other non-standard setting. WIRE also brings WWW access to the visually-impaired.

The WIRE system collects several existing technologies including text-to-speech and internet protocols, and enhances them with new technologies and methodologies, notably: an audio rendering scheme for structured documents, a non-visual WWW browsing scheme, a non-keyword WWW search scheme and an interface to traditional browsers. The combination of these new and old technologies creates a tool which will help to increase the efficiency of commuters, travelers, and exercisers everywhere, and bring the World Wide Web to the visually-impaired for perhaps the first time.

Using a WIRE compliant device, a user could connect to the WWW from his car or from a hand-held system. The user would then be able to browse pages, conduct searches, and listen to information from the web being played audibly. Pages of interest could also be "flagged" for later investigation from a visual browser, and sites found using a visual browser could be flagged for later playback by the WIRE compliant device. Using this system, a user is freed from the visual attentiveness required by traditional browsers and is able to better utilize his otherwise unproductive time by browsing the WWW.

It is not intended that this invention be limited to the hardware or software arrangement or operational procedures shown disclosed. This invention includes all of the alterations and variations thereto as encompassed within the scope of the claims as follows.

We claim:

1. A non-visual browsing environment for the world-wide web comprising:
   a system for rendering structured documents on the world-wide web using audio, the structured documents comprising documents in which formatting and structural instructions are co-mingled with text content;
   an interface for information exchange to users; and,
   a non-keyword based world-wide web search system.

2. A non-visual browsing environment for the world-wide web as claimed in claim 1 further comprising:
   an E-mail support system;
   an audio files and streaming support system; and,
   a radio and commercials during document download system.

3. A non-visual browsing environment for the world-wide web as claimed in claim 1 wherein said system for rendering structured documents using audio comprises:
   a pre-rendering system which converts a structured document into an intermediate document; and an audio rendering system which generates an audio output.

4. A non-visual browsing environment for the world-wide web as claimed in claim 3 wherein said pre-rendering system comprises:

a segmenting document system for dividing said structured document into logical segments;

a categorizing document system for categorizing said logical segments as either navigation segments or content segments;

a document sectioning system for determining section structure of said structured document; and, a speech mark-up information system for creating said intermediate document which can be interpreted by a text-to-speech engine.

5. A non-visual browsing environment for the world-wide web as claimed in claim 4 wherein said document sectioning system comprises:

hierarchically sectioning means wherein sections are defined hierarchically using header tags as boundaries with top-level sections forming a top of a hierarchy and said header tags denoting subsections, sub-subsections and as many further gradations as are necessary to account for a number of prominence values present in said structured document.

6. A non-visual browsing environment for the world-wide web as claimed in claim 4 wherein:

said speech mark-up information system also determines which text shall be presented to said users.

7. A non-visual browsing environment for the world-wide web as claimed in claim 4 wherein said speech mark-up information system comprises:

meta-information generation means for producing meta-information in a form of commands which will cause said text-to-speech engine to vary voice, tone, rate, and other parameters to adequately convey information within said structured document.

8. A non-visual browsing environment for the world-wide web as claimed in claim 3 wherein:

said pre-rendering system and said audio rendering system work concurrently.

9. A non-visual browsing environment for the world-wide web as claimed in claim 1 wherein said interface for information exchange to users comprises:

a non-visual browsing system; and, an interface to said users for visual browsing environments.

10. A non-visual browsing environment for the word-wide-web as claimed in claim 1, wherein the structured documents include HyperText Markup Language (HTML) documents.

11. A non-visual browsing environment for the world-wide web comprising:

a system for rendering structured documents using audio;

an interface for information exchange to users; and, a non-keyword based search system; wherein said system for rendering structured documents using audio comprises:

a pre-rendering system which converts a structured document into an intermediate document; and, an audio rendering system which actually generates an audio output; wherein said pre-rendering system comprises:

a segmenting document system for dividing said structured document into logical segments;

a categorizing document system for categorizing said logical segments as either navigation segments or content segments;

a document sectioning system for determining section structure of said structured document; and, a speech mark-up information system for creating said intermediate document which can be interpreted by a text-to-speech engine; wherein said categorizing document system comprises:

calculation means for calculating a link density of each of said logical segments according to the formula:

$$D = \frac{C_{HREF} + (K * L_I)}{C}$$

where

D is said link density, $C_{HREF}$ is a number of non-tag characters in each of said logical segments which appear inside of HREF tags, C is a total number of non-tag characters in each of said logical segments, $L_I$ is a number of hyperlinks within image maps in each of said logical segments and K represents a weight given to image map links.

12. A method for providing a non-visual browsing environment for the world-wide web comprising the steps of:

rendering structured documents on the world-wide web using audio, the structured documents comprising documents in which formatting and structural instructions are co-mingled with text content;

providing an interface for information exchange to users; and, providing a non-keyword based world-wide web search system.

13. A method for providing a non-visual browsing environment for the world-wide web as claimed in claim 12 further comprising the steps of:

providing an E-mail support system;

providing an audio files and streaming support system; and, providing a radio and commercials during document download system.

14. A method for providing a non-visual browsing environment for the world-wide web as claimed in claim 12 wherein rendering structured documents using audio comprises the steps of:

performing a pre-rendering process which converts a structured document into an intermediate document; and, performing an audio rendering process which actually generates an audio output.

15. A method for providing a non-visual browsing environment for the world-wide web as claimed in claim 14 wherein performing a pre-rendering process comprises the steps of:

dividing said structured document into logical segments;

categorizing said logical segments as either navigation segments or content segments;

determining section structure of said structured document; and, creating said intermediate document which can be interpreted by a text-to-speech engine.

16. A method for providing a non-visual browsing environment for the world-wide web as claimed in claim 15 wherein determining section structure comprises the step of:

defining sections hierarchically using header tags as boundaries with top-level sections forming a top of a hierarchy and said header tags denoting subsections, sub-subsections and as many further gradations as are necessary to account for a number of prominence values present in said structured document.

17. A method for providing a non-visual browsing environment for the world-wide web as claimed in claim 15 wherein creating said intermediate document comprises the step of:

producing meta-information in a form of commands which will cause said text-to-speech engine to vary voice, tone, rate, and other parameters to adequately convey information within said structured document.

18. A method for providing a non-visual browsing environment for the world-wide web as claimed in claim 12 wherein providing an interface for information exchange to users comprises the steps of:

providing a non-visual browsing system; and, providing an interface to users for visual browsing environments.

19. A non-visual browsing environment for the word-wide-web as claimed in claim 12, wherein the structured documents include HyperText Markup Language (HTML) documents.

20. A method for providing a non-visual browsing environment for the world-wide web comprising the steps of:

rendering structured documents using audio;

providing an interface for information exchange to users; and, providing a non-keyword based world-wide web search system;

wherein rendering structured documents using audio comprises the steps of:

performing a pre-rendering process which converts a structured document into an intermediate document; and, performing an audio rendering process which actually generates an audio output; wherein performing a pre-rendering process comprises the steps of:

dividing said structured document into logical segments;

categorizing said logical segments as either navigation segments or content segments;

determining section structure of said structured document; and, creating said intermediate document which can be interpreted by a text-to-speech engine; wherein categorizing said logical segments comprises the step of:

calculating a link density of each of said logical segments according to the formula:

$$D = \frac{C_{HREF} + (K * L_I)}{C}$$

where

D is said link density, $C_{HREF}$ is a number of non-tag characters in each of said logical segments which appear inside of HREF tags, C is a total number of non-tag characters in each of said logical segments, $L_I$ is a number of hyperlinks within image maps in each of said logical segments and K represents a weight given to image map links.

21. A method for non-visual browsing of the world-wide web comprising the steps of:

providing audio feedback from a browser to a user, the audio feedback including audio playback of at least one hyperlink anchor of a world-wide web document;

selecting a most recently played hyperlink anchor;

controlling volume of the audio feedback using an audio volume dial;

selecting at least one of a plurality of browsing modes wherein each mode provides a specific kind of audio rendering of a world-wide web document and wherein all modes begin a world-wide web document by speaking a title of said world-wide web document;

scrolling through a world-wide web document using scan-forward, scan-reverse and pause controls;

maintaining a traditional world wide web browser history list; and, providing for immediate access to a number of user selected world wide web documents.

22. A non-visual browsing environment, comprising:

a system for rendering structured documents on a global computer network using audio, the structured documents comprising documents in which formatting and structural instructions are co-mingled with text content;

an interface for information exchange to a user, wherein the interface provides audio output to the user according to the audio rendering of a structured document and wherein the interface allows the user to input commands to navigate through the audio rendering of the structured document; and, a non-keyword based system for searching the global computer network.

* * * * *